(12) United States Patent
Bae et al.

(10) Patent No.: US 8,701,407 B2
(45) Date of Patent: Apr. 22, 2014

(54) HYDRAULIC ACTIVE BOOSTER

(75) Inventors: Seung Hyup Bae, Chungnam (KR);
Chang Bok Ko, Kyungki-Do (KR)

(73) Assignee: Mando Corporation, Pyeongtaek-Si (KR)

( * ) Notice: Subject to any disclaimer, the term of this patent is extended or adjusted under 35 U.S.C. 154(b) by 833 days.

(21) Appl. No.: 12/943,559

(22) Filed: Nov. 10, 2010

(65) Prior Publication Data

US 2011/0108377 A1    May 12, 2011

(30) Foreign Application Priority Data

Nov. 10, 2009  (KR) .......................... 10-2009-107834

(51) Int. Cl.
*B60T 13/128*    (2006.01)

(52) U.S. Cl.
USPC ...................................... 60/547.1; 303/115.1

(58) Field of Classification Search
USPC ............... 60/547.1, 562, 576, 581; 303/115.1
See application file for complete search history.

(56) References Cited

U.S. PATENT DOCUMENTS

| 4,244,185 | A  | * | 1/1981  | Belart .......................... 60/550 |
| 6,494,546 | B1 | * | 12/2002 | Feigel ....................... 303/113.4 |
| 6,808,238 | B2 | * | 10/2004 | Drott et al. ................ 303/114.1 |
| 7,517,027 | B2 | * | 4/2009  | Aoki et al. ................. 303/114.1 |

FOREIGN PATENT DOCUMENTS

| JP | 2005-104334 A    | 4/2005  |
| KR | 10-2009-0077182 A | 7/2009  |
| KR | 10-2009-0121927 A | 11/2009 |

OTHER PUBLICATIONS

Korean Office Action issued in Korean Patent Application No. 10-2009-0107834 dated May 10, 2013.

* cited by examiner

*Primary Examiner* — Thomas E Lazo
(74) *Attorney, Agent, or Firm* — McDermott Will & Emery LLP

(57) ABSTRACT

Disclosed is a hydraulic active booster capable of easily adjusting the structure of a simulator. The simulator of the hydraulic active booster includes a simulator housing having a first receiving part for receiving a control plunger, a second receiving part for receiving a part of a first piston into which the control plunger is inserted, and a third receiving part for receiving a simulator piston. The third receiving part is separated from the first and second receiving parts.

6 Claims, 2 Drawing Sheets

HYDRAULIC ACTIVE BOOSTER

This application claims the benefit of Korean Patent Application No. 10-2009-0107834 filed on Nov. 10, 2009, in the Korean Intellectual Property Office, the disclosure of which is incorporated herein by reference.

BACKGROUND

1. Field

The disclosure relates to a hydraulic active booster, and more particularly to a hydraulic active booster capable of mechanically separating a control plunger from a piston of a master cylinder in a normal operation mode and rapidly forming braking pressure according to pedal force of a driver in an abnormal operation mode.

2. Description of the Related Art

In general, when a driver steps on a brake pedal, a hydraulic active booster (HAB) detects displacement of the brake pedal from a pedal displacement sensor and closes a shut-off valve to separate a master cylinder of a pedal simulator from a fluid path, and an electronic control unit (ECU) calculates wheel pressure according to a pressure signal of a pressure sensor to control pressure of each wheel through an independent feedback control.

When the HAB fails, the shut-off valve is switched into a normally open (NO) state, so liquid pressure of the master cylinder corresponding to pedal force of the driver is transferred to a wheel cylinder so that the braking operation can be performed upon the system failure.

Meanwhile, the HAB according to the related art includes a simulator having a simulator piston and a simulator spring elastically supporting the simulator piston. Such a simulator is configured to be coupled to an open end of the master cylinder.

As mentioned above, the simulator piston and the simulator spring are installed in the simulator. However, since the simulator piston and the simulator spring are installed in a limited space together with a control plunger, there is difficulty to control the shape and the number of the simulator piston and the simulator spring.

SUMMARY

Accordingly, it is an aspect of the disclosure to provide a hydraulic active booster capable of diversifying the structure of a simulator including a simulator piston and a simulator spring.

Additional aspects and/or advantages of the disclosure will be set forth in part in the description which follows and, in part, will be apparent from the description, or may be learned by practice of the disclosure.

The foregoing and/or other aspects of the disclosure are achieved by providing a hydraulic active booster including an input shaft connected to a brake pedal, a pedal simulator to provide repulsive force against the brake pedal, a control plunger connected to the brake pedal and movable in an axial direction in the pedal simulator, a master cylinder including a first piston, into which the control plunger is inserted, and a second piston moving back and forth according to movement of the first piston to transfer hydraulic pressure to a wheel brake, and an oil supply device for supplying oil to the pedal simulator. The pedal simulator includes a simulator housing having a first receiving part for receiving the control plunger, a second receiving part for receiving a part of the first piston into which the control plunger is inserted, and a third receiving part for receiving a simulator piston, and the third receiving part is separated from the first and second receiving parts.

According to the disclosure, the simulator piston, first and second simulator springs for elastically supporting the simulator piston, and simulator spring retainers for supporting the first and second simulator springs are provided in the third receiving part.

According to the disclosure, the simulator housing is formed with a first oil port for supplying oil from the oil supply device to the second receiving part and a second oil port for supplying the oil to the third receiving part.

According to the disclosure, the simulator housing is formed with an oil path allowing the oil introduced into the second oil port to be supplied to the third receiving part through the first receiving part.

According to the disclosure, the first piston is formed with an insertion hole and the control plunger is inserted into the insertion hole in such a manner that a predetermined gap is formed between a rear end of the insertion hole and a front end of the control plunger.

According to the disclosure, a pedal displacement sensor is connected to the input shaft to measure displacement of the brake pedal.

As described above, according to one aspect of the disclosure, the space for installing the simulator piston and the simulator spring is separated from the space for installing the control plunger in the HAB, so that the structure of the simulator piston and the simulator spring can be variously adjusted.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EXEMPLARY EMBODIMENTS

Figure 1:
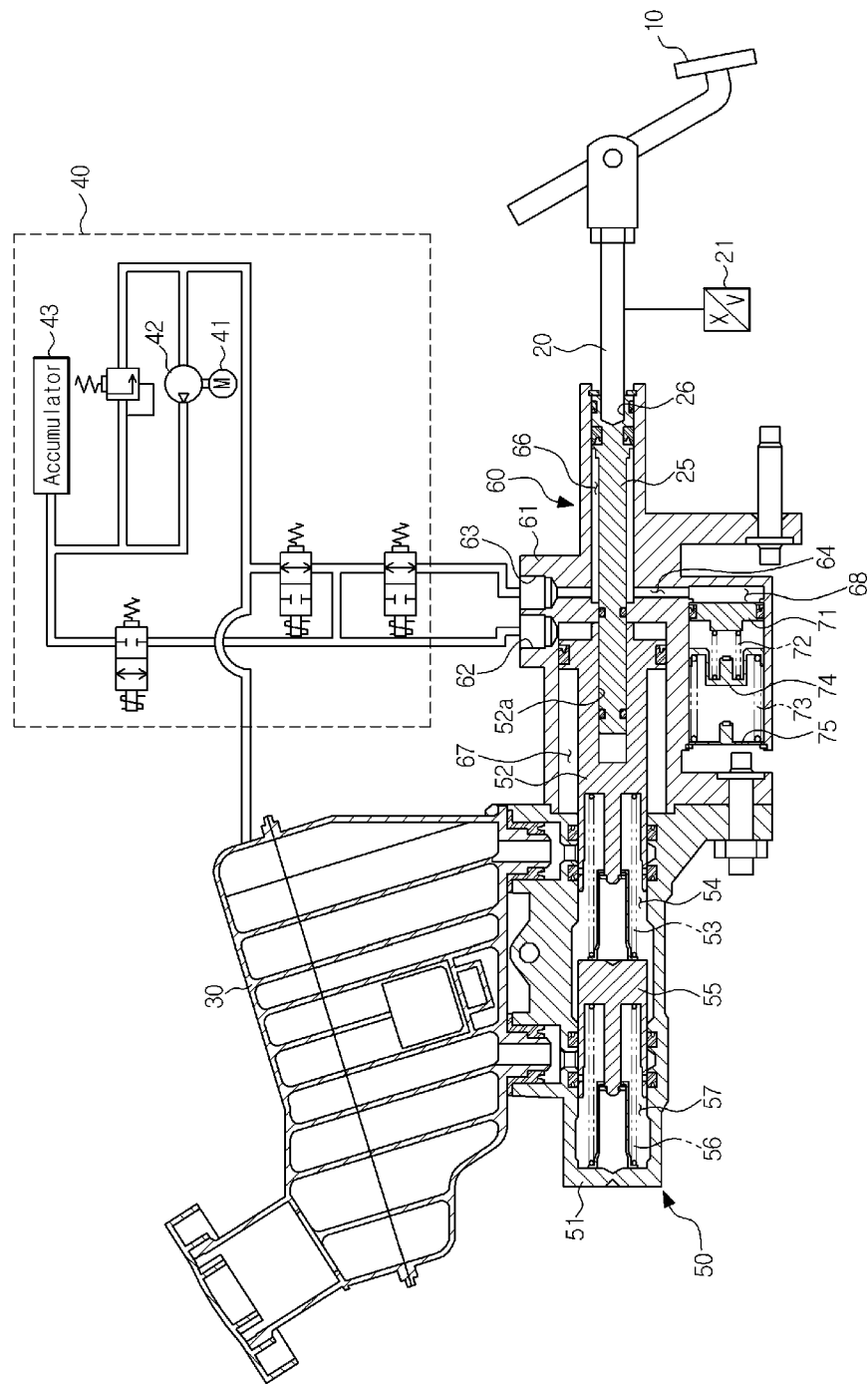
FIG. 1 is a sectional view showing a hydraulic active booster according to one embodiment of the disclosure.

Reference will now be made in detail to the embodiments of the disclosure, examples of which are illustrated in the accompanying drawings, wherein like reference numerals refer to the like elements. The embodiments are described below to explain the disclosure by referring to the figures.

Figure 2:
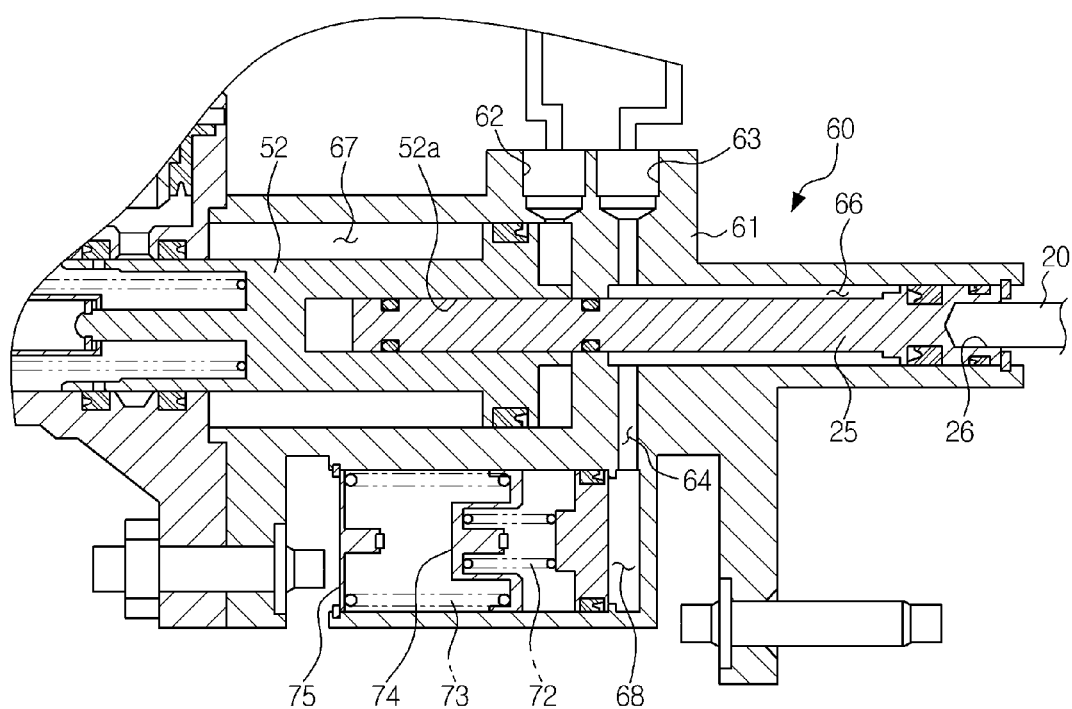
FIG. 2 is an enlarged sectional view showing a part of FIG. 1.

FIG. 1 is a sectional view showing a hydraulic active booster (HAB) according to one embodiment of the disclosure and FIG. 2 is an enlarged sectional view showing a part of FIG. 1.

As shown in FIGS. 1 and 2, the HAB according to the embodiment of the disclosure includes an input shaft 20 connected to a brake pedal 10 operated by a driver upon the braking operation, a pedal simulator 60 to provide repulsive force against the brake pedal 10, a master cylinder 50 to transfer braking pressure to a wheel brake (not shown) as the braking pressure is generated by the brake pedal 10, a reservoir 30 provided at an upper portion of the master cylinder 50 to store oil therein, and an oil supply device 40 for providing the braking pressure to the pedal simulator 60.

The master cylinder 50 includes a master cylinder housing 51 coupled with the reservoir 30 storing the oil. The master cylinder housing 51 includes a first piston 52, into which a control plunger 25 is inserted, a second piston 55 moving back and forth according to the movement of the first piston 52, a first chamber 54 formed between the first and second pistons 52 and 55 to compress oil, a first spring 53 installed between the first and second pistons 52 and 55 to transfer the operational force of the first piston 52 to the second piston 55, a second chamber 57 formed between the second piston 55 and the inner wall of the master cylinder housing 51 to compress oil, and a second spring 56 installed between the second piston 55 and the master cylinder housing 51 to elastically support the second piston 55.

The first piston 52 protrudes toward an open rear surface of the master cylinder housing 51 and a part of the first piston 52 is accommodated in a simulator housing 61, which will be described later.

As mentioned above, the input shaft 20 is connected to the brake pedal 10 and accommodated in the control plunger 25, which is movable in the axial direction in the simulator housing 61. In addition, the input shaft 20 is provided with a pedal displacement sensor 21 to detect the braking pressure applied from the driver.

A hole 26 is formed at one end of the control plunger 25 to receive the input shaft 20. The other end of the control plunger 25 is inserted into the first piston 52 of the master cylinder 50. Thus, the first piston 52 is formed with an insertion hole 52a into which the control plunger 25 is inserted. The control plunger 25 inserted into the insertion hole 52a is spaced apart from a rear end of the insertion hole 52a.

In detail, a front end of the control plunger 25 is spaced apart from the rear end of the insertion hole 52a in such a manner that the force applied to the input shaft 20 connected to the brake pedal 10 may not be transferred to the first piston 52 in the normal operation mode. In the case of the regenerative braking, the first piston 52 does not make contact with the control plunger 25 even if the first piston 52 moves back, so that the pedal feel may not be degraded.

In the case of the abnormal operation mode, the control plunger 25 moves in the insertion hole 52a by a predetermined distance corresponding to an interval between the rear end of the insertion hole 52a and the front end of the control plunger 25, and then moves the first piston 52 in the axial direction. In detail, the control plunger 25 mechanically makes contact with the first piston 52 in the abnormal operation mode and transfers the force of the input shaft 20 to the first piston 52, so that the brake pressure is formed due to the pressure of the master cylinder 50.

The pedal simulator 60 includes a simulator housing 61 coupled to an open end of the master cylinder housing 51. The simulator housing 61 includes a first receiving part 66 for receiving the control plunger 25, a second receiving part 67 for receiving a part of the first piston 52 into which the control plunger 25 is inserted, and a third receiving part 68 for receiving a simulator piston 71, which will be described later.

In detail, the control plunger 25 is installed in the first receiving part 66 in such a manner that the control plunger 25 can move in the axial direction. As shown in the drawings, the first receiving part 66 has the inner diameter suitable for making contact with the outer surface of an end of the control plunger 25 into which the input shaft 20 is inserted.

The part of the first piston 52, into which the control plunger 25 is inserted, is accommodated in the second receiving part 67 in such a manner that the part of the first piston 52 can move in the axial direction. As shown in the drawings, the second receiving part 67 has the inner diameter suitable for making contact with the outer surface of the flange formed on a part of the first piston 52.

As shown in the drawing, the third receiving part 68 is formed below the first and second receiving parts 66 and 67 while being separated from the first and second receiving parts 66 and 67. As mentioned above, the simulator piston 71, first and second simulator springs 72 and 73 for elastically supporting the simulator piston 71, and simulator spring retainers 74 and 75 for supporting the first and second simulator springs 72 and 73 are provided in the third receiving part 68. The simulator piston 71 can axially move in the third receiving part 68 by oil supplied from the oil supply device 40 in the normal operation mode of the HAB.

The simulator housing 61 is formed with a first oil port 62 for supplying oil from the oil supply device 40 to the second receiving part 67 and a second oil port 63 for supplying the oil to the third receiving part 68.

The first oil pot 62 is communicated between the inner wall of the second receiving part 67 of the simulator housing 61 and the first piston 52. The second oil port 63 is communicated between the inner wall of the third receiving part 68 of the simulator housing 61 and the simulator piston 71 through an oil path 64. In addition, the second oil port 63 of the simulator housing 61 is communicated with the first and third receiving parts 66 and 68 through the oil path 64.

The oil supply device 40 includes a motor 41 controlled by an electronic control unit (not shown), a pump 42 actuated by the motor 41, and an accumulator 43 for temporarily storing high-pressure oil generated as the pump 42 is operated.

As mentioned above, the motor is controlled by the electronic control unit. In detail, the electronic control unit detects the operation of the pedal by using the pedal displacement sensor 21 and adjusts the braking pressure corresponding to the pedal force of the driver by controlling the motor 41.

A pressure sensor (not shown) can be provided at an outlet of the accumulator 43 to measure oil pressure of the accumulator 43. The oil pressure measured by the pressure sensor is compared with a predetermined pressure and the pump 42 is actuated when the measured oil pressure is lower than the predetermined pressure in such a manner that the accumulator 43 can be charged with the predetermined pressure.

Hereinafter, the operation of the HAB according to the disclosure will be described with reference to accompanying drawings.

In the case of the normal operation mode of the HAB, if the driver steps on the brake pedal 10, the input shaft 20 connected to the brake pedal 10 moves in the axial direction to the left and the control plunger 25 moves to the left in the simulator housing 61.

At this time, the movement of the input shaft 20 is detected by the pedal displacement sensor 21 and the detected signal is transmitted to the electronic control unit. Thus, the electronic control unit drives the motor 41 to operate the pump 42 for generating the braking pressure and oil having high pressure generated by the pump 42 is stored in the accumulator 43.

That is, the oil supply device 100 detects the pedal force of the driver based on the pedal displacement sensor 21 and transmits the signal to the electronic control unit and the electronic control unit controls the accumulator 43 to transfers the oil having the high pressure corresponding to the pedal force of the driver to the second and third receiving parts 67 and 68 of the simulator housing 61.

Thus, the first piston 52 moves to the left due to the braking pressure transferred to the second receiving part 67 of the simulator housing 61 and the second piston 55 moves to the left by the first piston 55. As a result, the oil is compressed by the first and second pistons 52 and 55 and the compressed oil is transferred to the wheel brake, thereby generating the braking force.

As the input shaft 20 moves to the left, the control plunger 25 moves to the space formed between the control plunger 25 and the insertion hole 52a of the first piston 52 and the first piston moves 52 to the left due to the pressure introduced into the second receiving part 67. Since the control plunger 25 is not mechanically connected to the first piston 52 in the normal operation mode, the force transferred to the control plunger 25 through the input shaft 20 may not be transferred to the first piston 52. In addition, since the first piston 52 is mechanically separated from the control plunger 25, variation of the pedal feel caused by variation of liquid pressure in the master cylinder 50 may not occur in the regenerative braking operation.

The simulator piston 71 moves to the left due to the braking pressure introduced into the third receiving part 68 of the simulator housing 61 and the pedal feel may not be degraded due to the liquid pressure generated by the repulsive force of the first and second simulator springs 72 and 73 that elastically support the simulator piston 71.

In addition, in the case of the abnormal operation mode of the HAB, the braking pressure is not introduced into the second and third receiving parts 67 and 68 and the input shaft 20 and the control plunger 25 move to the left as the brake pedal 10 is actuated.

At this time, the control plunger 25 moves in the insertion hole 52a of the first piston 52 to make contact with the rear end of the insertion hole 52a and then moves the first piston 52 to the left so that the second piston 55 is moved to the left by the first piston 52. Thus, the oil stored in the first and second chambers 54 and 57 of the master cylinder housing 51 is compressed and the compressed oil is transferred to the wheel brake.

Therefore, according to the embodiment of the disclosure, the control plunger 25 is inserted into the insertion hole 52a of the first piston 52 in such a manner that the front end of the control plunger 25 is spaced apart from the rear end of the insertion hole 52a by a predetermined distance, so that the first piston 52 is mechanically separated from the control plunger 25 in the normal operation mode. In addition, variation of the pedal feel caused by variation of liquid pressure in the master cylinder 50 may not occur in the regenerative braking operation.

In addition, according to the embodiment of the disclosure, the space for installing the simulator piston 71 is separated from the space for installing the control plunger 25 and the first piston 52 in the simulator housing 61, so that the structure of the simulator piston 71 and the simulator springs 72 and 73 can be variously adjusted.

Although few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A hydraulic active booster comprising:
an input shaft connected to a brake pedal;
a pedal simulator to provide repulsive force against the brake pedal;
a control plunger connected to the brake pedal and movable in an axial direction in the pedal simulator;
a master cylinder including a first piston, into which the control plunger is inserted, and a second piston moving back and forth according to movement of the first piston to transfer hydraulic pressure to a wheel brake; and
an oil supply device for supplying oil to the pedal simulator,
wherein the pedal simulator includes a simulator housing having a first receiving part for receiving the control plunger, a second receiving part for receiving a part of the first piston into which the control plunger is inserted, and a third receiving part for receiving a simulator piston, and
the third receiving part is separated from the first and second receiving parts.

2. The hydraulic active booster of claim 1, wherein the simulator piston, first and second simulator springs for elastically supporting the simulator piston, and simulator spring retainers for supporting the first and second simulator springs are provided in the third receiving part.

3. The hydraulic active booster of claim 2, wherein the simulator housing is formed with a first oil port for supplying oil from the oil supply device to the second receiving part and a second oil port for supplying the oil to the third receiving part.

4. The hydraulic active booster of claim 3, wherein the simulator housing is formed with an oil path allowing the oil introduced into the second oil port to be supplied to the third receiving part through the first receiving part.

5. The hydraulic active booster of claim 1, wherein the first piston is formed with an insertion hole and the control plunger is inserted into the insertion hole in such a manner that a predetermined gap is formed between a rear end of the insertion hole and a front end of the control plunger.

6. The hydraulic active booster of claim 1, wherein a pedal displacement sensor is connected to the input shaft to measure displacement of the brake pedal.

* * * * *